(12) United States Patent
Yu

(10) Patent No.: US 7,641,830 B2
(45) Date of Patent: Jan. 5, 2010

(54) METHOD OF CONTINUOUSLY FEEDING FILM PIECE FOR MOLDING PROCESS

(75) Inventor: Tsung-Wen Yu, Taichung Hsien (TW)

(73) Assignee: Snyang Yu Enterprise Co., Ltd, Taichung Hsien (TW)

( * ) Notice: Subject to any disclaimer, the term of this patent is extended or adjusted under 35 U.S.C. 154(b) by 319 days.

(21) Appl. No.: 11/704,330

(22) Filed: Feb. 9, 2007

(65) Prior Publication Data

US 2008/0191380 A1    Aug. 14, 2008

(51) Int. Cl.
*B28B 11/14* (2006.01)
(52) U.S. Cl. ........................ 264/160; 264/157; 264/163; 264/316; 425/110; 425/122; 425/126.1; 425/202; 425/289
(58) Field of Classification Search ................ 264/157, 264/163, 160, 269, 316, 516, 521, 522, 544, 264/550; 425/110, 111, 112, 122, 125, 126.1, 425/202, 289, 292, 295, 298, 302.1, 311
See application file for complete search history.

(56) References Cited

U.S. PATENT DOCUMENTS

| | | | |
|---|---|---|---|
| 4,554,775 A * | 11/1985 | Asami et al. ................... 53/64 |
| 5,707,581 A * | 1/1998 | Yamazaki .................... 264/511 |
| 5,925,302 A * | 7/1999 | Oono et al. .................. 264/267 |
| 5,945,059 A * | 8/1999 | Atake .......................... 264/510 |
| 2001/0022413 A1* | 9/2001 | Oono et al. .................. 264/267 |
| 2002/0100522 A1* | 8/2002 | Benton et al. ................ 148/320 |
| 2003/0062116 A1* | 4/2003 | Lee ............................. 156/249 |
| 2004/0025476 A1* | 2/2004 | Oliverio et al. ................ 53/450 |
| 2005/0086911 A1* | 4/2005 | Dutt et al. ...................... 53/412 |

\* cited by examiner

*Primary Examiner*—Joseph S. Del Sole
*Assistant Examiner*—Timothy Kennedy
(74) *Attorney, Agent, or Firm*—Browdy and Neimark, PLLC

(57) ABSTRACT

A method of continuously feeding film pieces for the molding process includes a film preparation task, a film drawing task, a film cutting task and a film feeding task. The film preparation task includes preparing a roll of film and drawing the film out and fixing a head end thereof at a first position. The film drawing task includes holding the film and drawing the film along a film feeding direction to have the head end to a second position. The film cutting task includes cutting the film off to have a film piece,. The film feeding task includes holding the film piece and moving the film piece to a third position. The film preparation task, the film drawing task and film cutting task are repeated in sequence for continuously feeding film pieces for the molding process.

9 Claims, 16 Drawing Sheets

METHOD OF CONTINUOUSLY FEEDING FILM PIECE FOR MOLDING PROCESS

BACKGROUND OF THE INVENTION

1. Field of the Invention

The present invention relates to a molding process, and more particularly to a method of continuously feeding film pieces for a molding process.

2. Description of the Related Art

Thin film processes and tasks are incorporated in many industries. FIGS. 1 to 5 show a film feeding machine 1 and a die assembly 2 having a first die member 2a and a second die member 2b which are incorporated in a film molding process. The film feeding machine 1 includes a reel 3 and a clip device 4 above and under the die assembly 2. A roll of a film 5 is mounted on the reel 3 to provide the film 5 between the first die member 2a and the second die member 2b, and the clip device 4 holds the film at an opposite side of the die assembly 2. A heater 6 is moved to a position between the first die member 29a and the second die member 2b and moved toward the film 5 to press the film 5 on the second die member 2b and heat it. Next, the film 5 is suck on a sidewall of a recess of the second die member 2b by vacuum, and then the first die member 2a and the second die member 2b are combined together for injection molding process. After the injection molding process, the film 5 is cut off and the clip device 4 releases the residual film 5a (referring to FIG. 5) to get a product 7 with the film on a surface thereof after the die assembly 2 is opened. Above steps may be repeated for mass production.

However, above process must have the clip device 4 to straight the film 5 from the roll and the film 5 must extend out of the die assembly 2 to be held by the clip device 4, therefore there always is a section of the film 5 being cut off every time when the product is molded. The cut-off film is waste (referring to FIG. 4 and FIG. 5) and there will be a greater amount of the film being waste in mass production. In addition, the reel 3 and the clip device 4 can not provide the film 5 with a precise tension that may cause the injection molding process failure. Again, the above process must include the step of cutting the film off that increases the time of the whole process. The heater 6 is an external device, which must have a controller to be operated, and it increases the space and cost for the whole equipment.

SUMMARY OF THE INVENTION

The primary objective of the present invention is to provide a method of continuously feeding film pieces that has advantages of lower cost, less space taken, lower defective ratio and high efficiency.

According to the objective of the present invention, a method of continuously feeding film pieces includes a film preparation task, a film drawing task, a film cutting task and a film feeding task. The film preparation task includes preparing a roll of film having a head end, a tail end and a plurality of cut-off end between the head end and the tail end and drawing the head end of the film out and fixing the head end at a first position. The film drawing task includes holding the head end of the film and drawing the film along a film feeding direction to have the head end to a second position from the first position, and then holding the film to have the cut-off end between the first position and the second position. The film cutting task includes cutting the film off at the cut-off end to have a film piece, wherein the film piece have a first end, which is the head end of the film, and a second end, which is the cut-off end, and the residual film has a new head end at the cut-off end. The film feeding task includes holding the film piece and moving the film piece to a third position. The film preparation task, the film drawing task and film cutting task are repeated in sequence for continuously feeding film pieces.

DETAILED DESCRIPTION OF THE INVENTION

Figure 1:
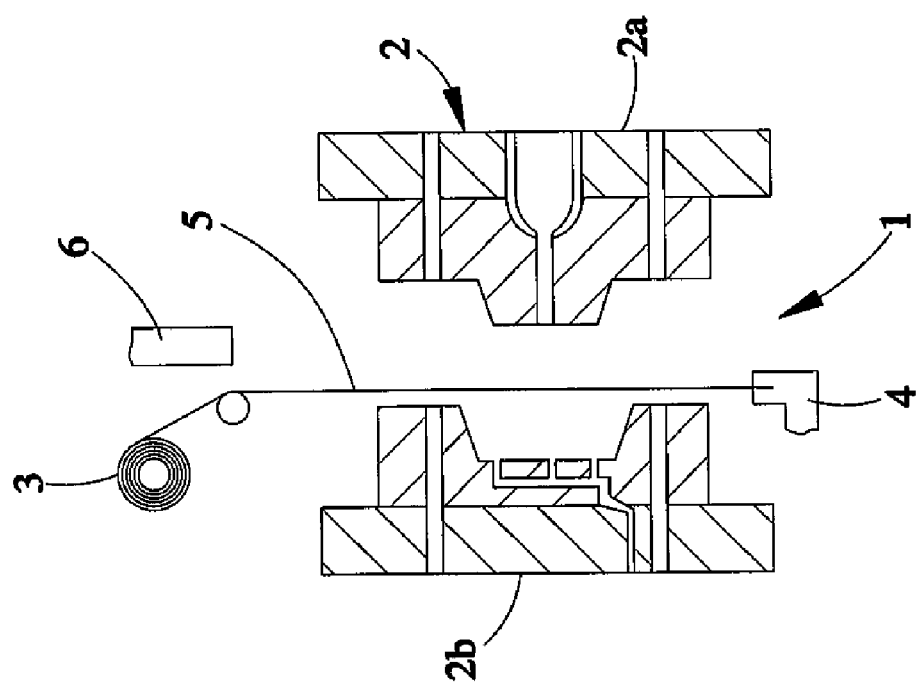
FIG. 1 to FIG. 5 are sketch diagrams of the conventional equipment for the molding process.
Figure 2:
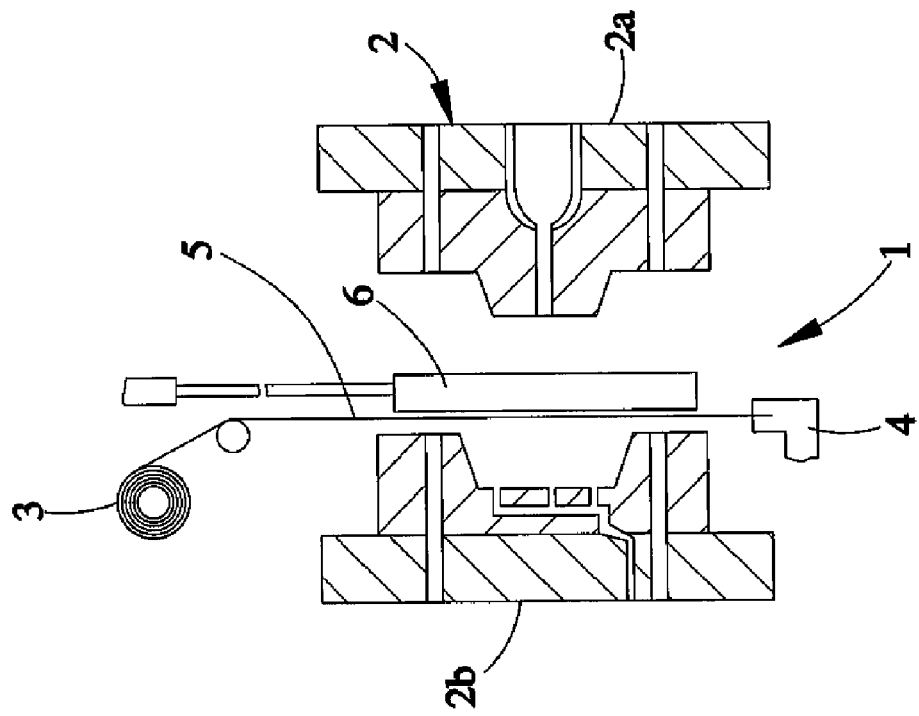
Figure 4:
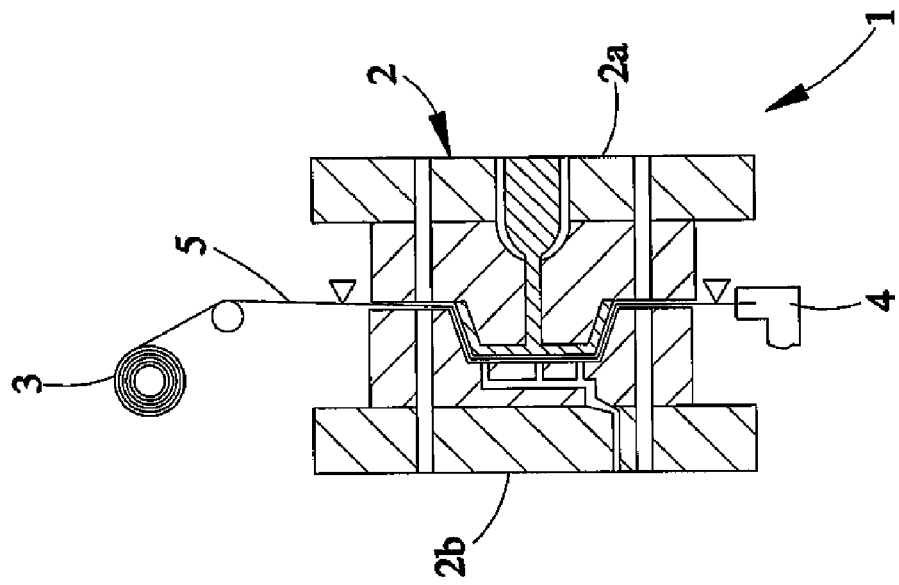
Figure 3:
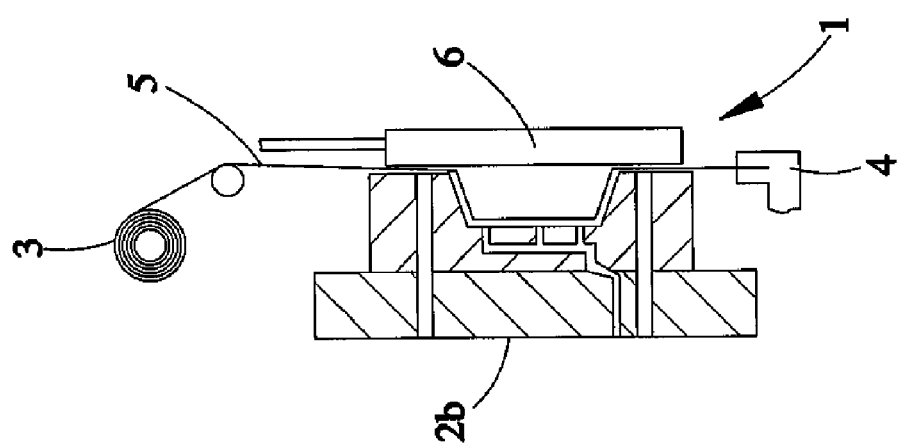
Figure 5:
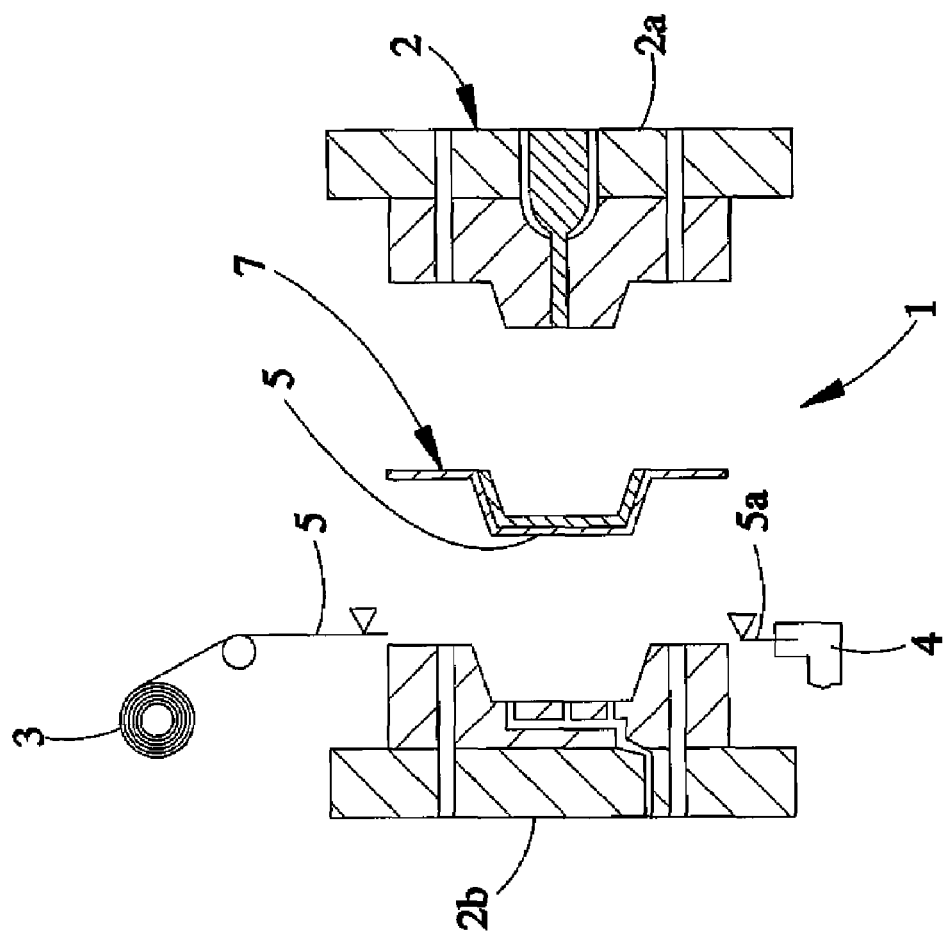

As shown in FIGS. 6 to 17, a film feeding machine 100 for the method of feeding film pieces of the preferred embodiment of the present invention comprises a frame 10, a feeding device 20, a film base 30, a drawing device 40, a cutting device 50 and a heating device 60.

Figure 6:
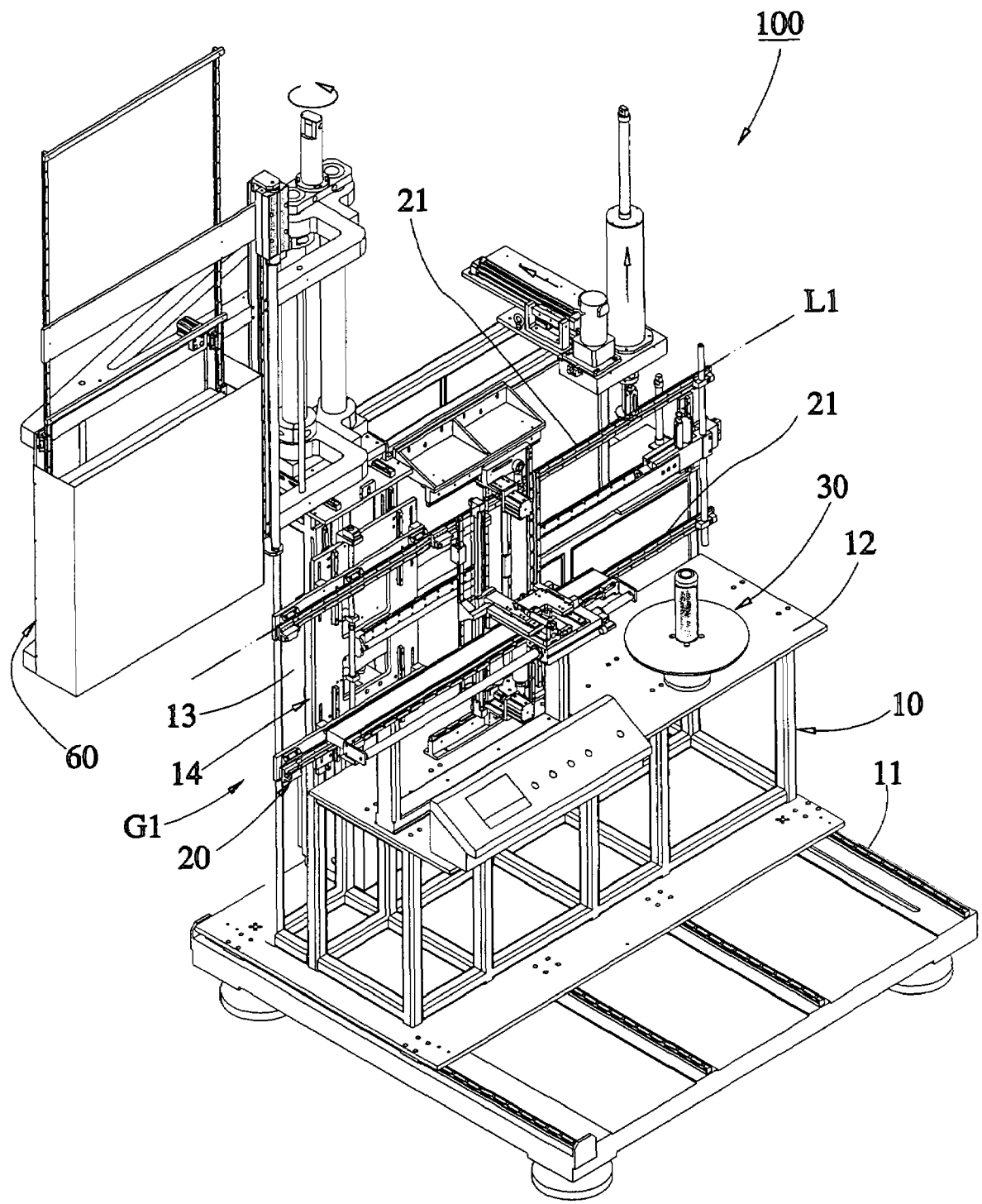
FIG. 6 is a perspective view of a preferred embodiment of the present invention.
Figure 7:
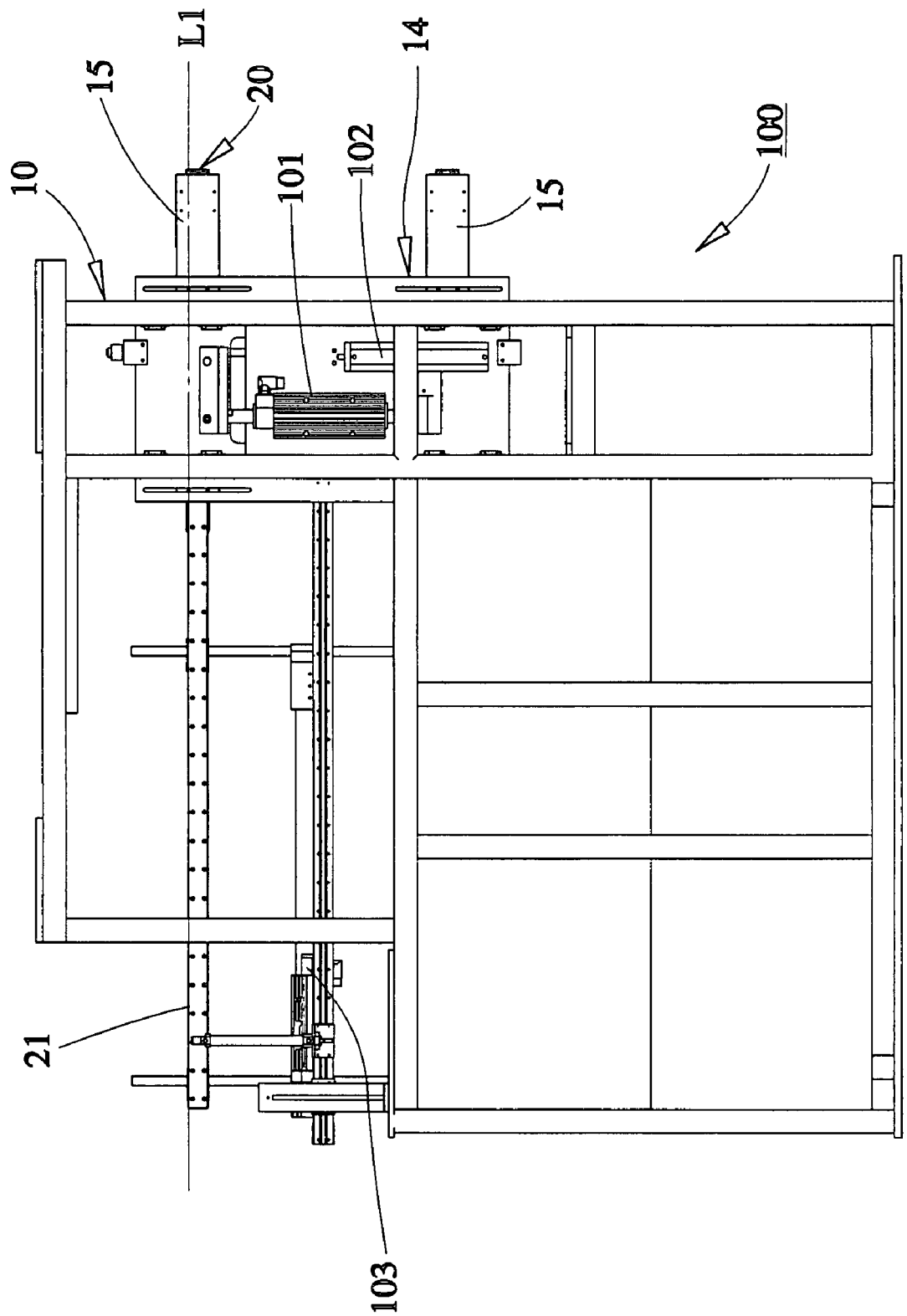
FIG. 7 is a rear view of FIG. 6, showing the server axle and the weight cylinder.
Figure 8:
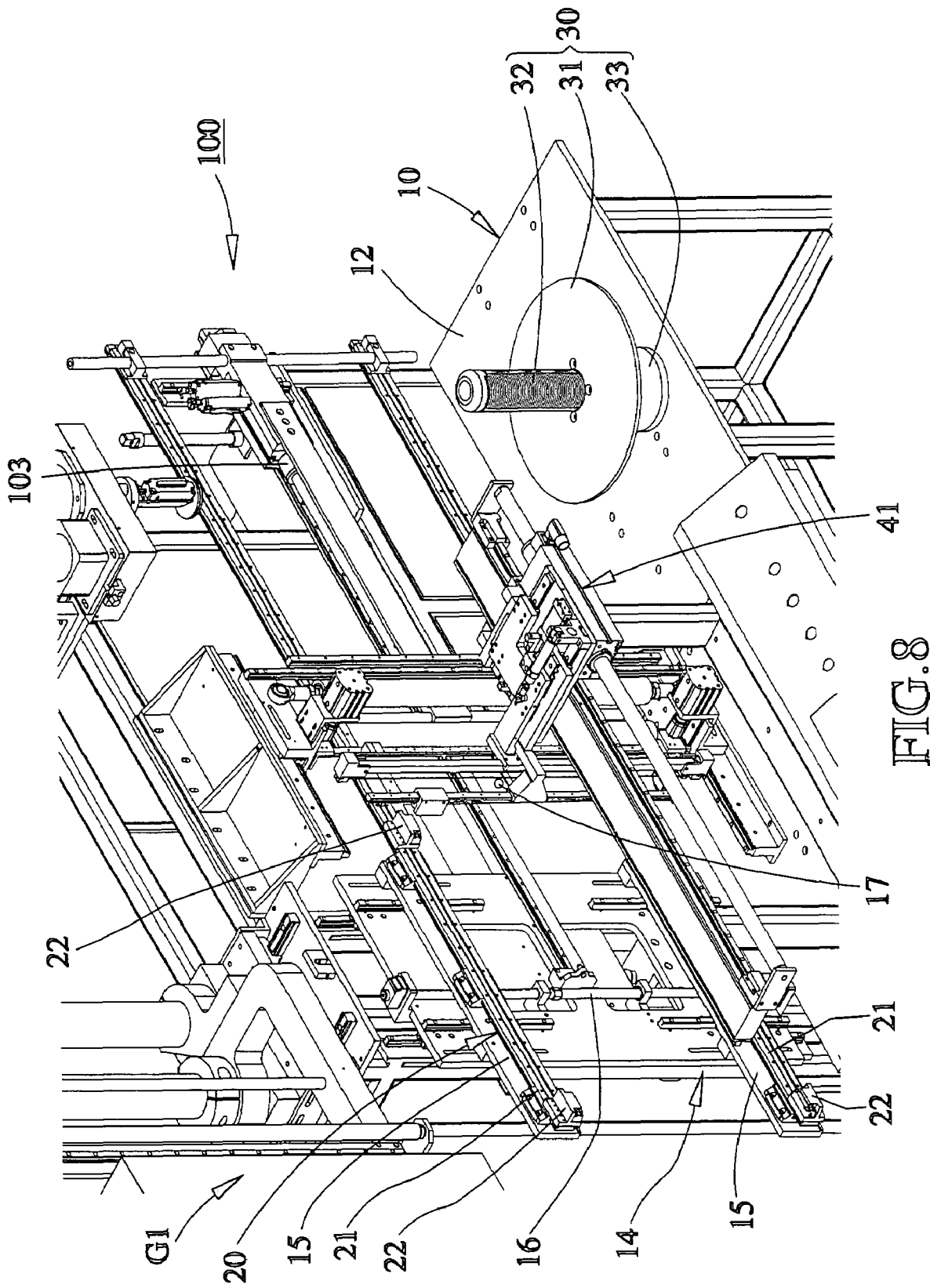
FIG. 8 is an enlarged view in part of FIG. 6.
Figure 18:
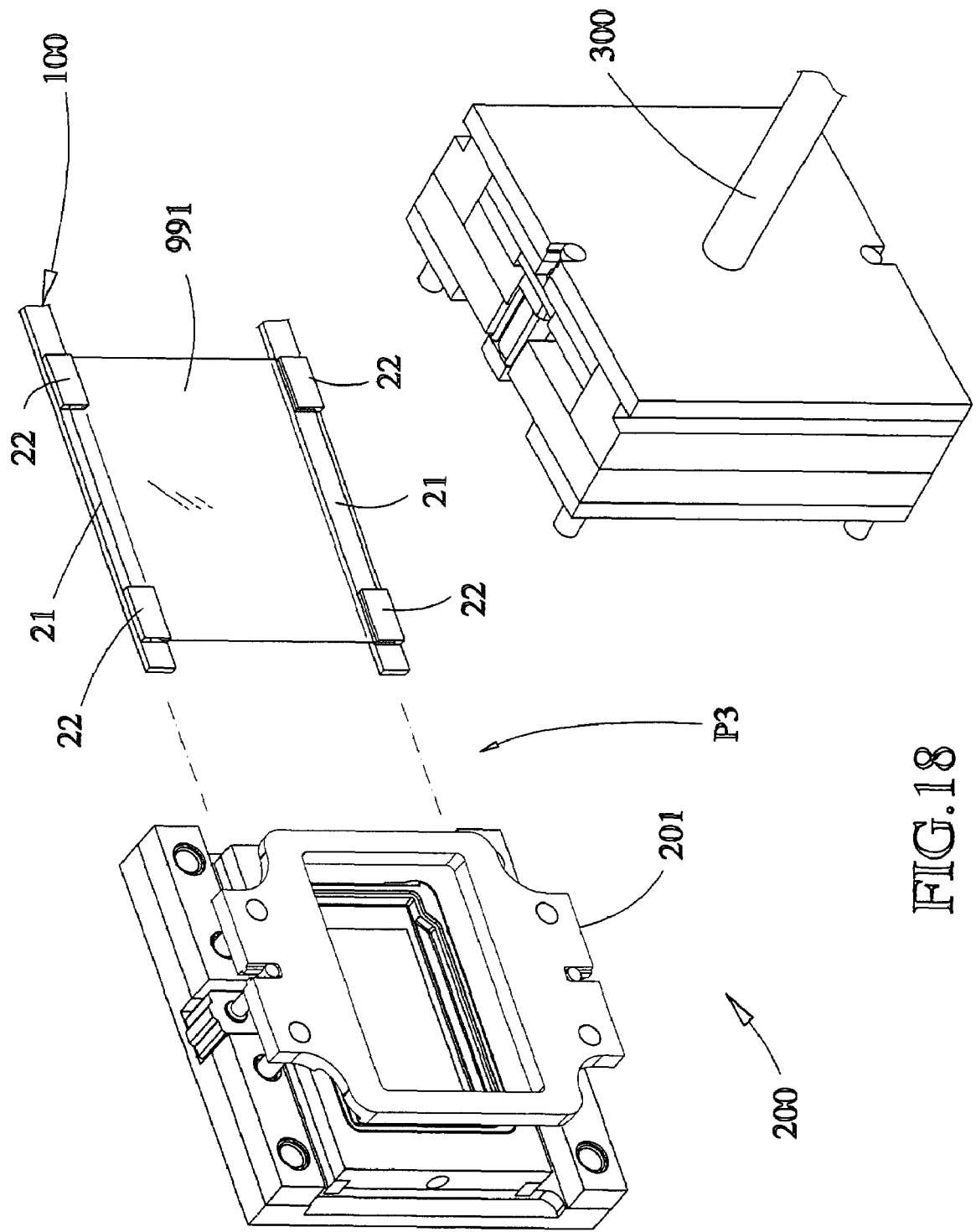
FIG. 18 is a perspective view of the film feeding machine incorporated in the die assembly and injection molding machine.

As shown in FIGS. 6 to 8, the frame 10 has a movable base 11 for horizontal movement, a horizontal plate 12 and a vertical plate 13. The film base is mounted on the horizontal plate 12, and a support base 14 and the feeding device 30 are mounted on the vertical plate 13. A plane where the feeding device 20 is located is defined as a first axis Li. As shown in FIG. 7, the support base 14 is moved stably along the first axis Li relative to the frame 10 by a server axle 101 and a weight cylinder 102. The support base 14 includes two rail bases 15 (referring to FIG. 8) to be moved by two opposite worms 16. As a result, the feeding device 20 on the support base 14 fits various sizes of films and may be adjusted in height to fit a die assembly 200 and an injection molding machine 300 (referring to FIG. 18). The frame 10 is provided with a sensor 17 to sense targets printed on the film (not shown) for adjustment of the feeding device 20 along a direction perpendicular to the first axis L1 by the server axle 101 and the weight cylinder 102 through a control system so that the film is positioned before being sent to an external device (which is the injection molding machine 300 shown in FIG. 18).

The feeding device 20 includes two arms 21, which are connected to the rail bases 15 of the support base 14. The arms 21 are moved by a server axle 103 between a retracted position G1 (referring to FIG. 6) and an extended position G2 (referring to FIG. 17). The server axle 103 is controlled by the sensor 17 also to adjust the feeding device 20 along the first axis L1 for position of the film. The arms 21 have a clip portion associated with two clip cylinders 22 respectively. The clip cylinders 22 may hold four corners of the film to transport it.

Figure 9:
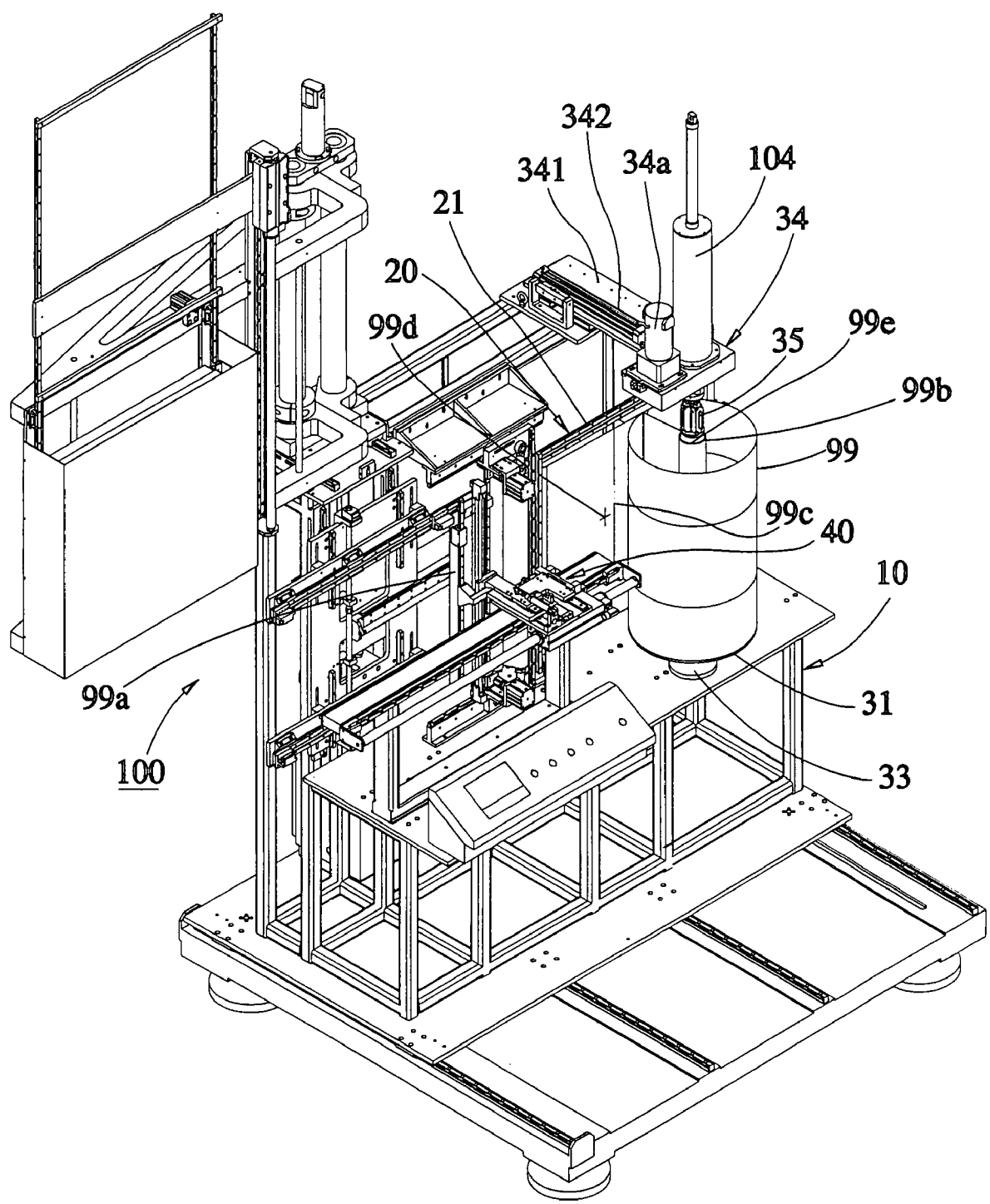
FIG. 9 is a perspective view of the film being drawn to the first position.
Figure 10:
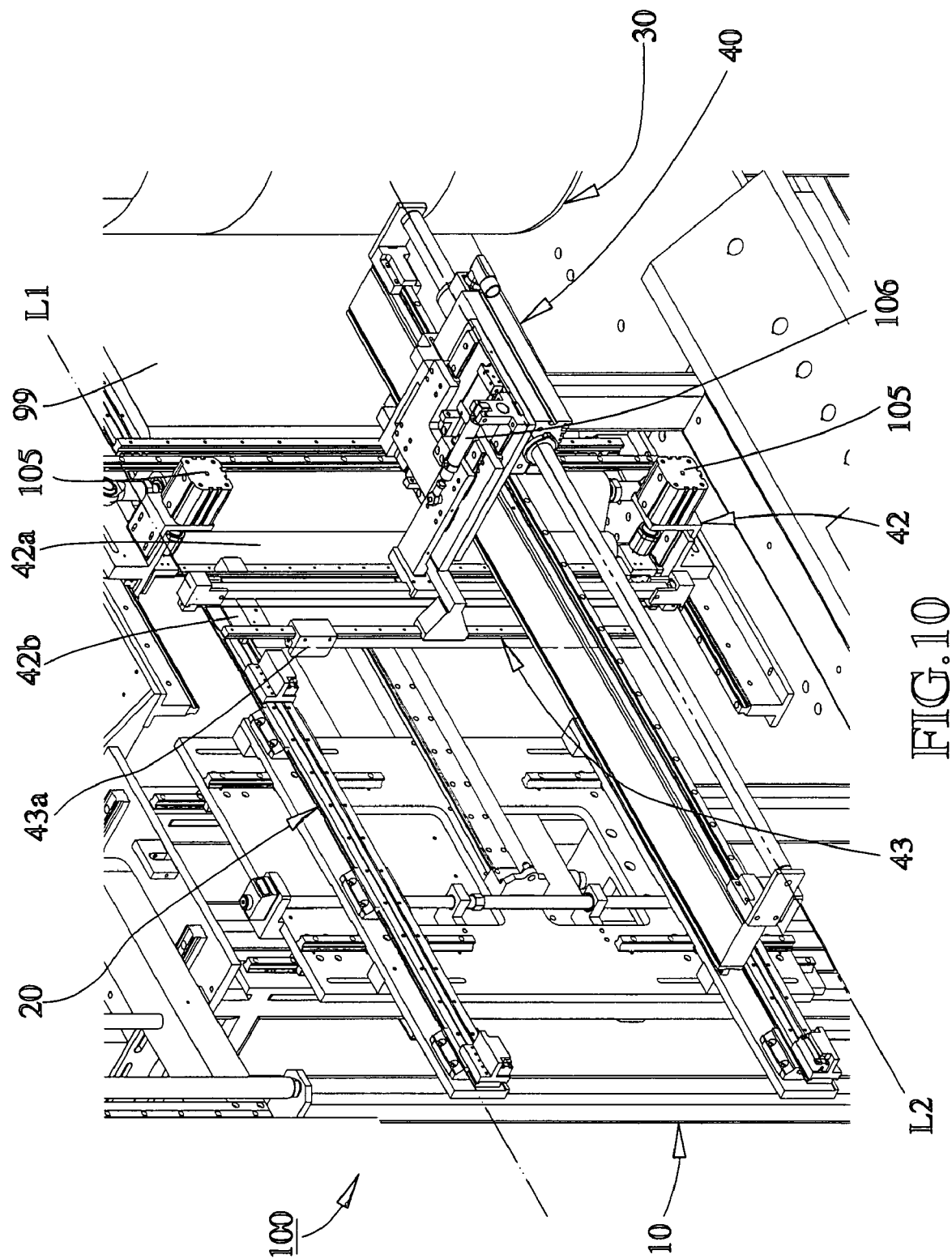
FIG. 10 is an enlarged view in part of FIG. 9.

The film base 30 is mounted on the horizontal plate 12 of the frame 10, which has a carrier 31, a worm bar 32 and an adjusting member 33. The adjusting member 33 includes a block in the present embodiment to support the carrier 31. The block has an interior threaded section (not shown) to be meshed with the worm bar 32. As shown in FIG. 9 and FIG. 10, rolls of film 99 with various sizes may be fitted to the worm bar 32 and rested in the carrier 31. The adjusting member 33 is turned to align the film 99 with the arms 21 that the film 99 drawn out of the roll may be hold by the arms 21. The film base 30 works with a fixing device 34 on the frame 10 for the film 99. The roll of the film 99 includes a hollow core 99a. The fixing device 34 includes a base 341 for horizontal movement and a pneumatic cylinder 342 connected to the base 341 to move the base 341 backwards for loading the roll of the film 99 on the film base 30. The base 341 is moved forwards by the pneumatic cylinder 342 again over the roll of the film 99. The base 341 has a motor 34a to turn a fastener 35 and a cylinder 104 to move the fastener 35 up and down. The fastener 35 is a cylinder in the present embodiment, which is a conventional device and will not describe the detail here. The fastener 35 is driven by the cylinder 104 to extend into the hollow core 99a that the roll of the film 99 may be turned by the motor 34a of the fixing device 34.

As shown in FIGS. 10 to 13, the drawing device 40 is mounted beside the feeding device 20, which includes a first driving member 41, a first drawing member 42 and a second drawing member 43.

The first driving member 41 is a server axle provided on the frame 10 in the present embodiment for reciprocation along a second axis L2. The second axis L2 is an axial direction of the server axle.

Figure 12:
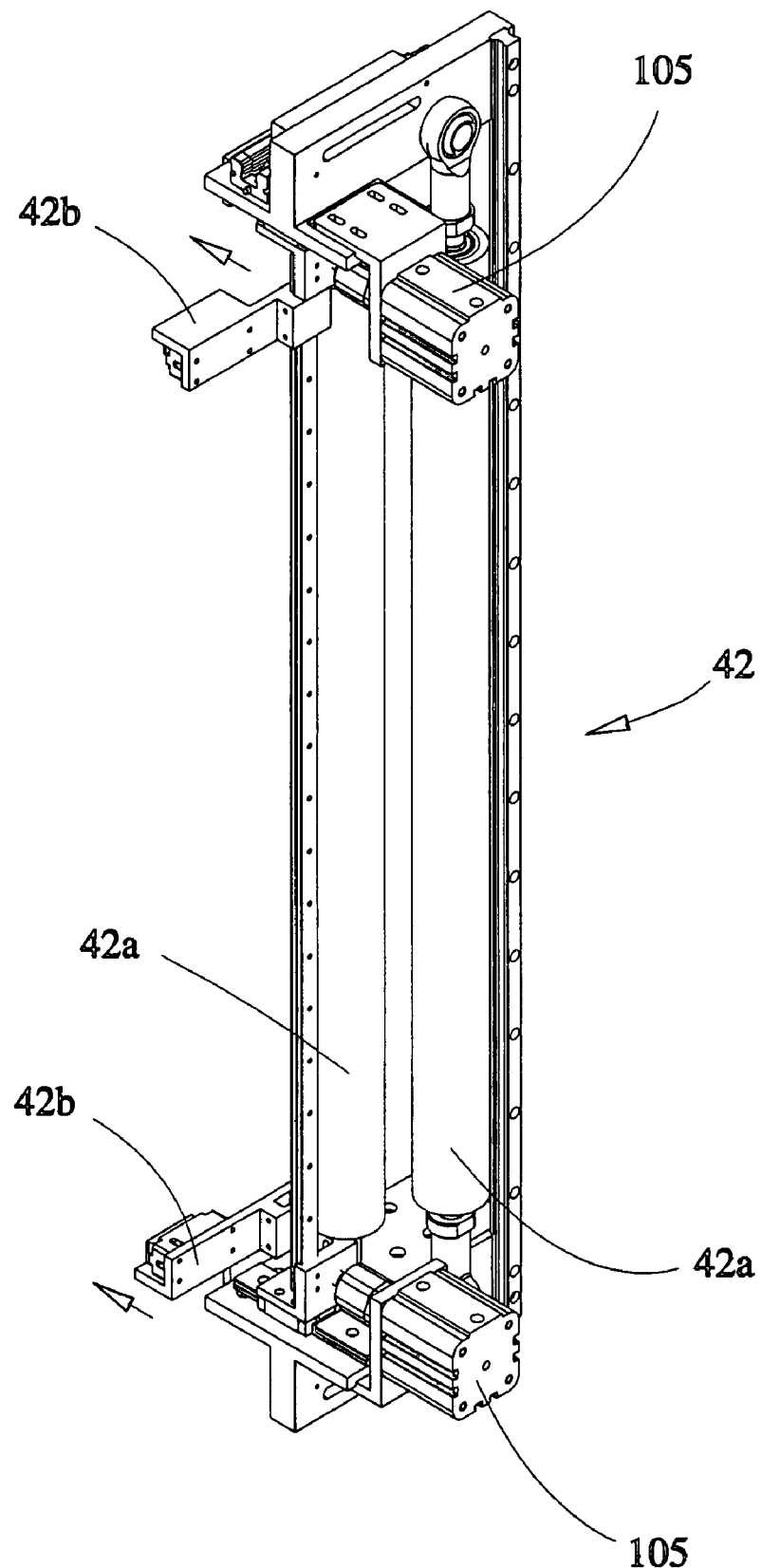
FIG. 12 is a perspective view of the first drawing member at the position before being moved by the cylinder.
Figure 13:
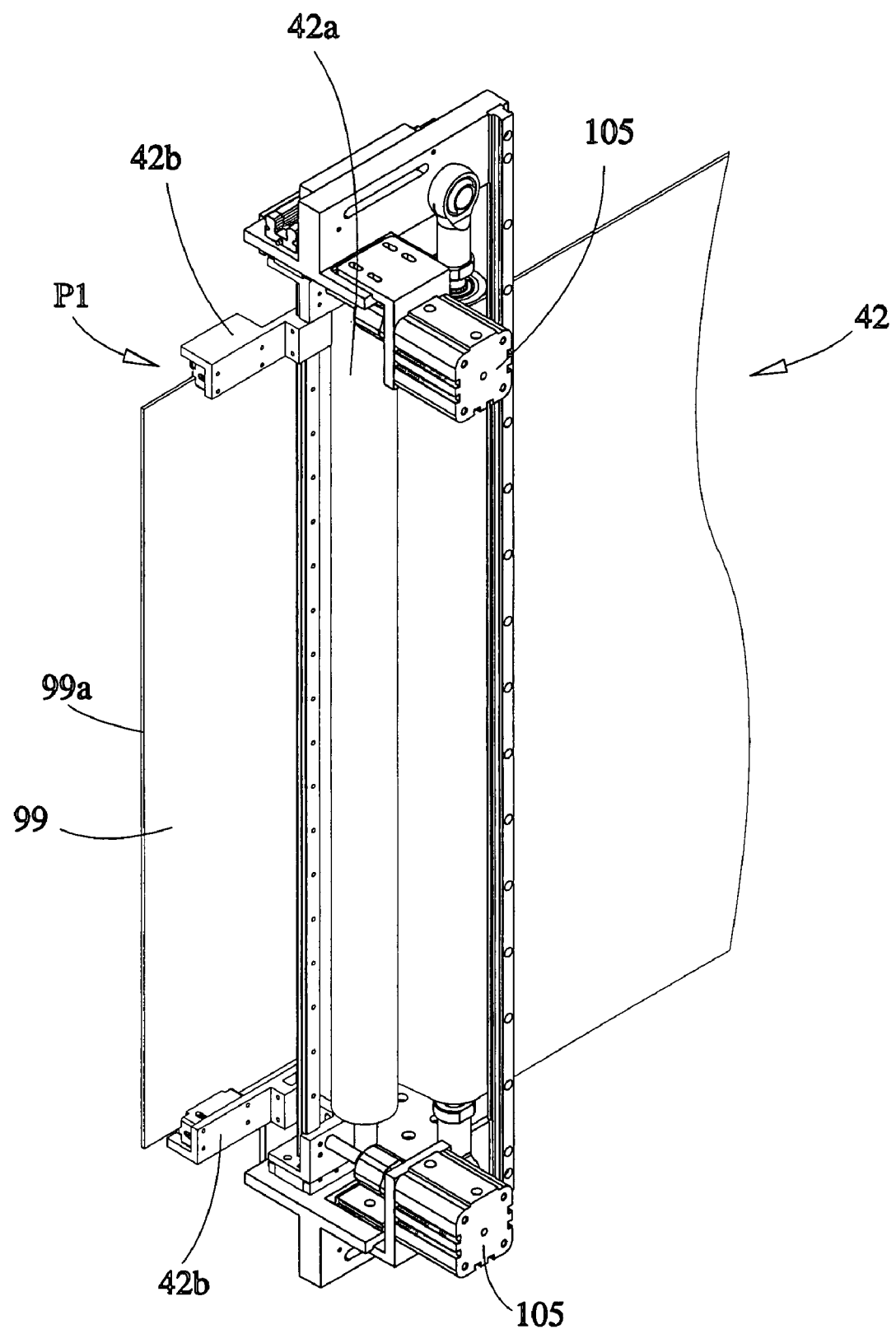
FIG. 13 is a perspective view of the first drawing member being moved by the cylinder along the first axis to the plane of the film.
Figure 14:
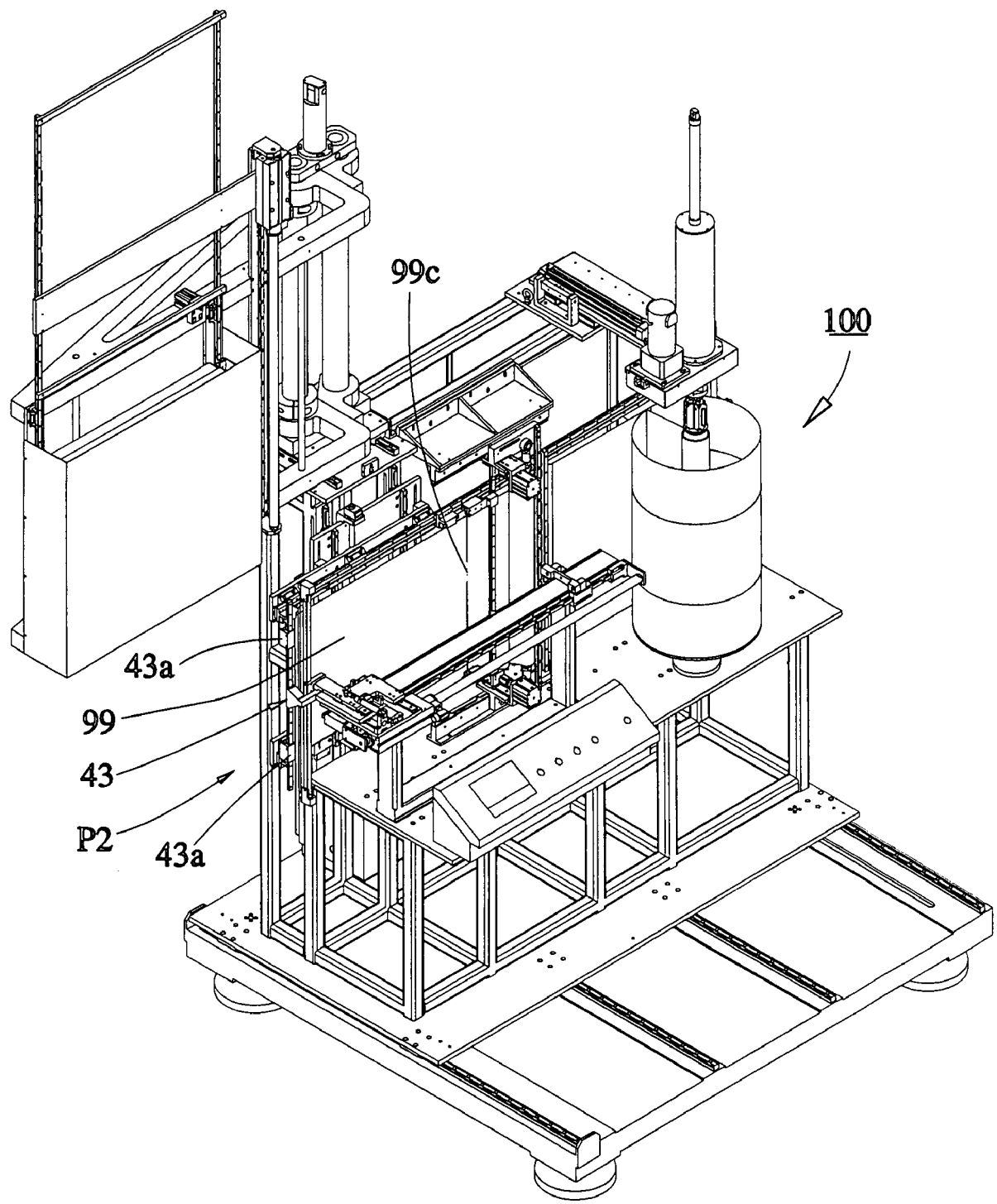
FIG. 14 is a perspective view of the film at the second position.
Figure 15:
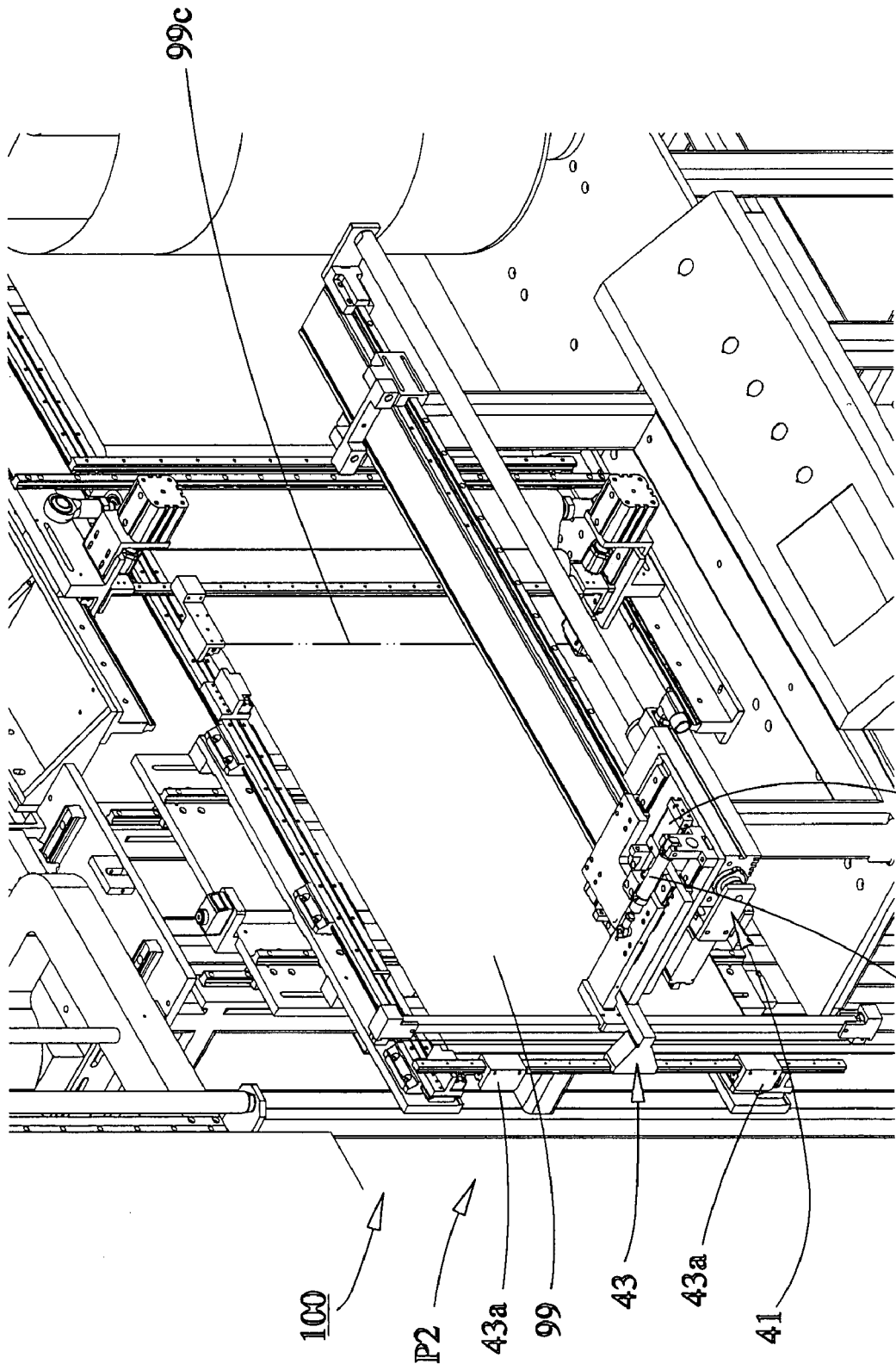
FIG. 15 is an enlarged view in part of FIG. 14.

As shown in FIG. 12 and FIG. 13, the first drawing member 42 is mounted on the frame 10 including a turning portion consisting of a set of rollers 42a, and a clip portion consisting of two clip cylinders 42b. The film 99 passes through rollers 42a to keep the direction of the film 99 and provide the film with a predetermined tension. The clip cylinders 42b may be adjusted to change a distance therebetween to fit various sizes of the films and may be moved by two cylinders 105 to a first position P1 (referring to FIG. 13) close to the first axis L1 to hold the film 99 from a position shown in FIG. 12.

Figure 11:
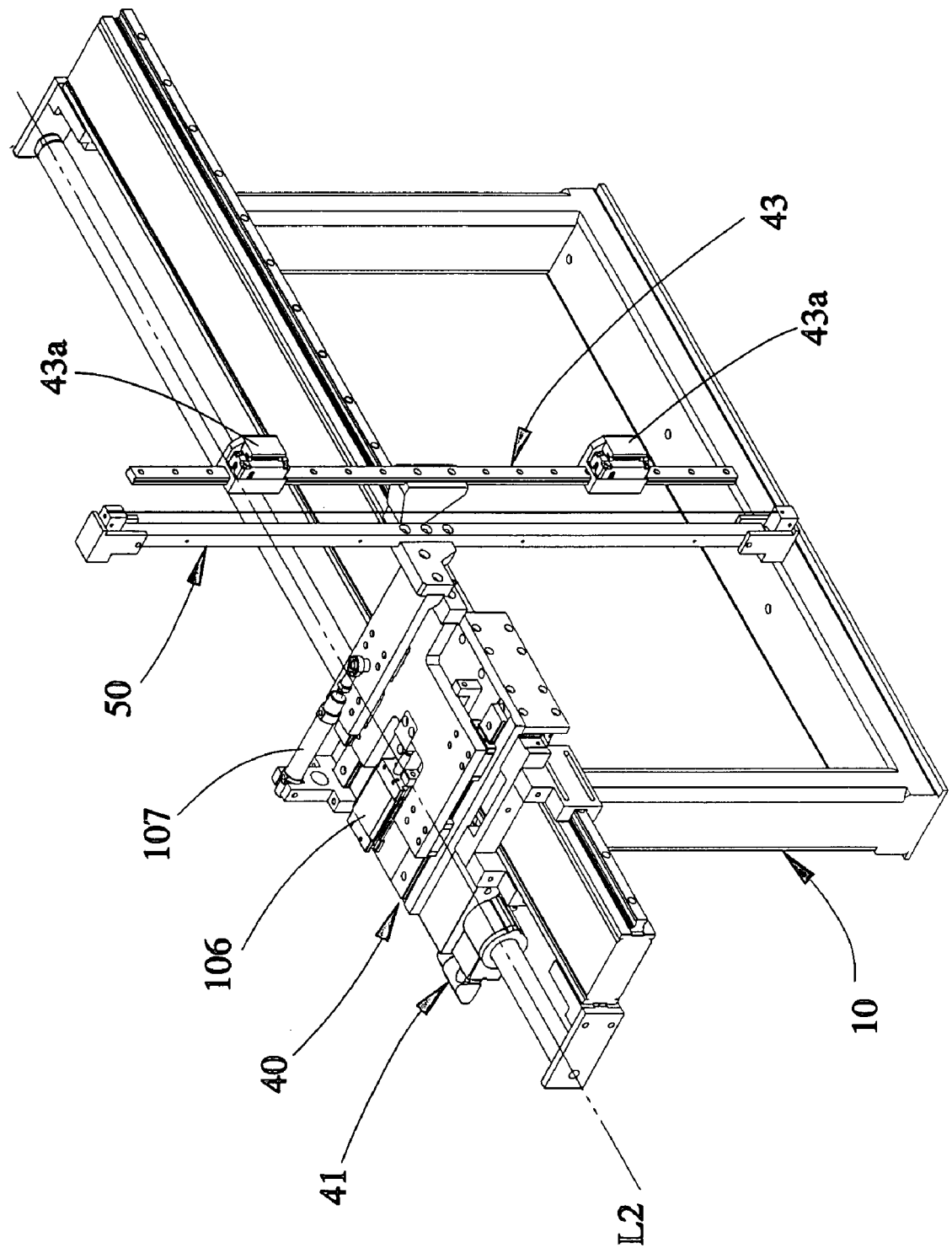
FIG. 11 is a perspective view of the drawing device, the first driving device and the cutting device.

As shown in FIG. 11, the second drawing member 43 has two clip cylinders 43a, which are connected to the first driving device 41 by a cylinder 106. The clip cylinders 43a are moved by the cylinder 106 toward the first axis L1 to a predetermined position for holding the film 99 and are moved by the first driving device 41 to move the film 99 between a first position P1, in which the film 99 is held by the first drawing member 42 (referring to FIG. 13), and a second position P2, in which the film 99 is held by the feeding device 20 (referring to FIG. 14 and FIG. 15).

Figure 16:
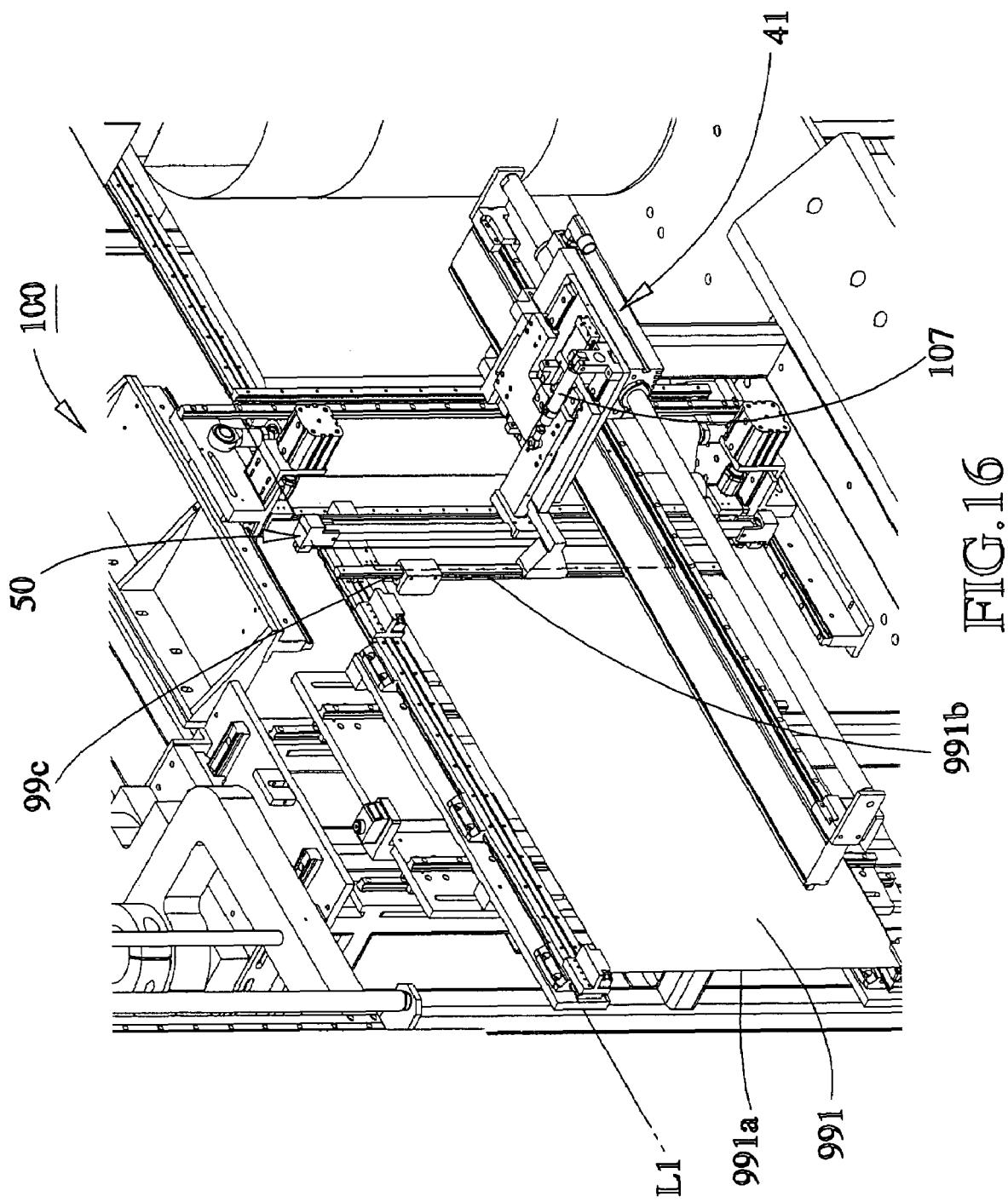
FIG. 16 shows the cutting device cutting the film into pieces.
Figure 17:
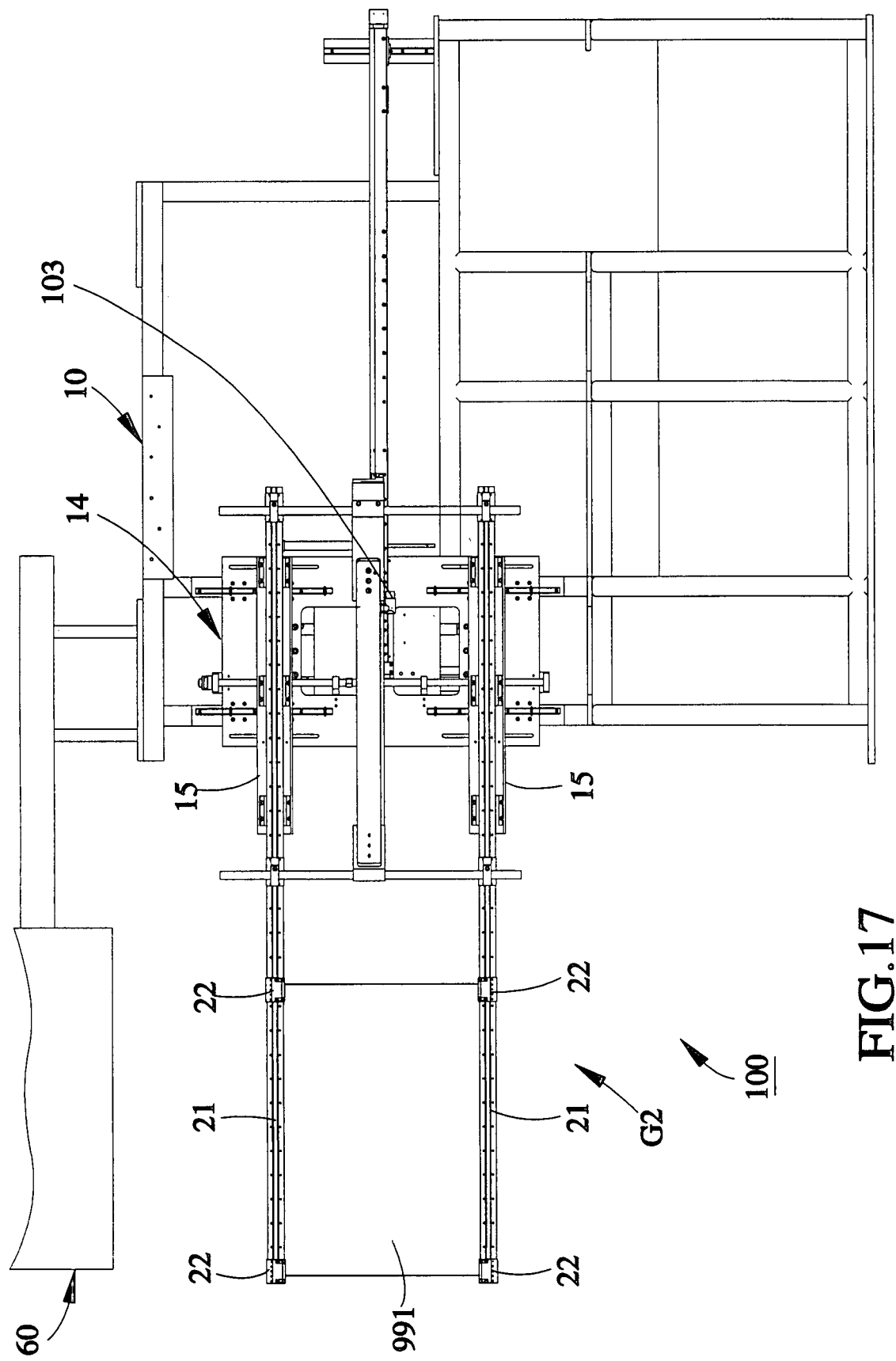
FIG. 17 is a front view of the arms before extended out.

As shown in FIG. 11, the cutting device 50 is connected to the first driving device 41 through a cylinder 107 to be moved toward the first axis L1 for cutting the film 99 off and get a film piece 991 (referring to FIG. 16).

As shown in FIG. 6, the heating device 60 is pivoted on the frame 10 to be moved along a direction perpendicular to the first axis L1. The heating device 60 is moved beside the film piece 991 for heating it while the arms 21 of the feeding device 20 holds the film piece 991 and moves to the extended position G2 (referring to FIG. 17). It takes less space. The heating device 60 may be may be leaned toward a front side of the frame 10 that provides a space for repair or other tasks.

The method of feeding film pieces of the present invention comprises the steps hereunder:

Film Preparation Task:

A roll of the film 99 is provided, which has a head end 99a, a tail end 99b and a plurality of cut-off ends 99c (referring to FIG. 9, they are virtual ends) between the head end 99a and the tail end 99b. Providing the roll of film 99 on the film base 30 and adjusting a height of the film base 30 to a level aligned with the die assembly 200. in addition, operating the fastener 35 of fixing device 34 entering a hollow core 99e of the roll of film 99 and expending the fastener 35 to press the hollow core 99e of the roll of film 99.

Next, operating the clip cylinders 42b of the first drawing member 42 for moving from a position shown in FIG. 12 to a position shown in FIG. 13 to have the clip cylinders 42b at the same level of the drawn-out film 99, and then drawing the head end 99a of the film 99 out of the film base 30 and through the rollers 42a of the first drawing member 42, and then operating the clip cylinders 42b holding the head end 99a of the film 99 at a first position P1 (referring to FIG. 13). After that, starting the motor 34a of the fixing device 34 for turning backwards a little to give the film 99 a predetermined tension.

Film Drawing Task:

Operating the cylinder 106 to move the second drawing member 43 to a plane where the film 99 is on and operating the clip cylinders 42b holding the head ends 99a of the film 99, and then operating the cylinders 42b of the first drawing member 42 releasing the film 99 and the first driving device 41 moving away from the film base 30 along second axis L2 to move the second drawing member 43 and the film 99 away from the film base 30, in which the head end 99a of the film 99 is moved to a tail position, which the head end 99a of the film 99 is a little over the clip cylinders 22 distal to the film base 30 and very close to the second position P2 but not over the second position P2. Meanwhile, the cut-off end 99c of the film is between the first position P1 and the second position P2. Operating the clip cylinders 22 proximal to the film base 30 holding the film 99 first, and then operating the first driving device to move the second drawing member 43 to the second position P2, and then operating the clip cylinders 22 distal to the film base 30 to hold the film 99 to give the film 99 a predetermined tension between the head end 99a and the cut-off end 99c.

Film Cutting Task:

After the arms 21 holds the film 99, operating the clip cylinders 43a of the second drawing member 43 releasing the film 99 and the first driving device 41 moving the second drawing member 43 towards tail ends of the arms 21 a little and the cylinder 106 moving the second drawing member 43 away from the film 99. Next, operating the first driving device 41 moving the second drawing member 43 back to a position around a position shown in FIG. 16 to have the cutting device aligned with the cut-off end 99c of the film 99. Meanwhile, the clip cylinders 42b of the first drawing member 42 hold the film again to have the film 99 being fixed at opposite sides of the cutting device 50, and then operating the cutting device 50 moving long the first axis L1 to cut the cut-off end 99c of the film 99 off that a film 991 is formed (referring to FIG. 16). The film 99 is held at opposite sides of the cut-off end 99c that the film 99 and the film piece 991 keep flat still. In addition, the film piece has a first end 991a and a second end 991b, in which the first end 991a is the head end 99a of the film 99 and the second end 991b is the cut-offend 99c. The film 99 after cut has the cut-offend to be a new head end 99a.

Film Feeding Task:

Operating the clip cylinders 42b of the first drawing member 42 moving along the second axis L2 back to a position shown in FIG. 12, and then the sensor 17 (such as sensing cylinder) senses a target 99d on the film 99 beside the cut-off end 99c automatically to control the server axle 101 fine adjusting the film piece 991 along a direction perpendicular to the first axis L1 (a feeding direction) and the server axle 103 adjusting the film piece 991 along the first axis L1 (a feeding direction). After fine adjustment, the feeding machine 100 is waiting for an order from the injection molding machine 300 and the die assembly 200. When the feeding machine 100 receives the order (it means the injection molding machine 300 and the die assembly 200 are ready), the arms 21 moves to a third position P3, in which the film 21 is aligned with the die assembly 200. The injection molding process begins after a clip plate 201 of the die assembly 200 and the clip cylinders 22 release the film piece 991 and back to the film feeding machine 100. In the period of injection molding process, the film feeding machine 100 repeats the film preparation task, the film drawing task and film cutting task so that when the injection molding process is completed and the die assembly is opened, the film feeding machine 100 starts the film feeding task immediately to feed a film piece 991 into the die assembly again that increase the efficiency of production. In addition, because the film piece 991 had been cut and positioned before being fed into the die assembly 200. It doesn't like the conventional process having the film being cut and positioned in the die assembly that causes the problems of film waste and higher defective ratio. The feeding machine 100 and the heating device 60 have the same frame 10 and controller that have a lower cost and less space taken.

The description above is a preferred embodiment of the present invention and the equivalence of the present invention is still in the scope of the claim of the present invention.

What is claimed is:

1. A method of continuously feeding film pieces from a roll of film, wherein the film having a head end, a tail end, and a plurality of cut-off ends between the head end and the tail end, the film being mounted to a film feeding machine and being vertical to a horizontal film feeding direction of the film feeding machine, the method comprising steps of:
    a) drawing the head end of the film out and fixing the head end at a first position inside the film feeding machine;
    b) holding the head end of the film and drawing the film along the film feeding direction to move the head end to a second position inside the film feeding machine and close to a die assembly from the first position, and then holding the film to locate one of the plurality of cut-off ends between the first position and the second position, wherein the die assembly is horizontally parallel to the film feeding direction of the film feeding machine;
    c) cutting the film off at the cut-off end at the film feeding machine to produce a film piece, the film piece having a first end, which is the head end of the film, and a second end, which is the cut-off end of the film; whereby, the residual of the film has a new head end at the cut-off end;
    d) holding and moving the film piece to a third position corresponding to the die assembly and then repeating the aforesaid steps a) through d) for continuously feeding the film pieces.

2. The method as defined in claim 1, further comprising a step of adjusting a position of the roll of the film along an axis direction before the step a).

3. The method as defined in claim 1, further comprising a sub-step of turning the roll of the film backwards before the step a).

4. The method as defined in claim 1, further comprising a sub-step of fixing the film at opposite sides of the cut-off end before the step c).

5. The method as defined in claim 1, further comprising a sub-step of adjusting a position of the film piece along the film feeding direction and a direction perpendicular to the film feeding direction respectively before the step d).

6. The method as defined in claim 1, wherein the film is held at four corners at the step b).

7. The method as defined in claim 6, wherein the step b) includes sub-steps of moving the head end of the film to a tail position, which is very close to the second position but not over the second position, and then drawing the film along the film feeding direction to move the head end of the film to the second position, and then fixing the film at a portion adjacent to the head end.

8. The method as defined in claim 1, wherein the film is held at four corners at the step d).

9. The method as defined in claim 5, wherein the film is provided with targets to be sensed for adjustment of the film.

\* \* \* \* \*